United States Patent
Sun et al.

(10) Patent No.: US 9,020,501 B2
(45) Date of Patent: Apr. 28, 2015

(54) METHOD FOR JUDGMENT AND RESIDENCY OF MULTI-CARD MOBILE TERMINAL SERVICE PROVIDER

(75) Inventors: Xiang Sun, Shanghai (CN); Xianliang Chen, Shanghai (CN); Yi Jin, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/989,415

(22) PCT Filed: Jul. 21, 2011

(86) PCT No.: PCT/CN2011/077415
§ 371 (c)(1),
(2), (4) Date: May 28, 2013

(87) PCT Pub. No.: WO2013/010330
PCT Pub. Date: Jan. 24, 2013

(65) Prior Publication Data
US 2014/0248872 A1 Sep. 4, 2014

(51) Int. Cl.
*H04W 4/00* (2009.01)
*H04W 60/00* (2009.01)
*H04W 8/18* (2009.01)
(Continued)

(52) U.S. Cl.
CPC .............. *H04W 60/00* (2013.01); *H04W 8/183* (2013.01); *H04W 48/20* (2013.01); *H04W 8/04* (2013.01); *H04W 88/06* (2013.01)

(58) Field of Classification Search
CPC ......... H04W 8/04; H04W 8/06; H04W 8/065; H04W 60/05; H04W 48/10; H04W 48/16; H04W 48/18; H04W 48/20
USPC ................. 455/430, 432.1, 434, 35.1–435.34
See application file for complete search history.

(56) References Cited

U.S. PATENT DOCUMENTS 5,987,325 A * 11/1999 Tayloe ........................ 455/435.2
8,805,355 B2 * 8/2014 Zhao ............................. 455/423
(Continued)

FOREIGN PATENT DOCUMENTS

CN 101184290 A * 5/2008 ............... H04Q 7/32

OTHER PUBLICATIONS

English translation of CN 101184290, publication date May 21, 2008, printed from Google patents on Oct. 21, 2014.*

*Primary Examiner* — Rafael Pérez-Gutiérrez
*Assistant Examiner* — Mark G. Pannell
(74) *Attorney, Agent, or Firm* — Kilpatrick Townsend & Stockton LLP (57) ABSTRACT

Methods for determination and residency of service provider of a multi-card mobile terminal are provided. A method for the residency of the multi-card mobile terminal comprises: when some or all cards belong to the same service provider, said cards will reside in the same cell. Some embodiments of the present invention acquire IMSI corresponding to each card and extract HPLMN or EHPLMN from the IMSI to identify from card storage information rapidly and accurately cards in the mobile terminal that belong to the same service provider, and make those cards reside in the same cell during starting-up stage, cell reselection, or network recovery under the circumstance of a plurality of cards belonging to the same service provider, thus reducing the realization difficulties in measurement, idle standby, synchronous maintenance, etc., stabilizing the system and optimizing the performance of mobile terminal.

14 Claims, 5 Drawing Sheets (51) Int. Cl.
*H04W 8/04* (2009.01)
*H04W 88/06* (2009.01)
*H04W 48/20* (2009.01)

(56) References Cited

U.S. PATENT DOCUMENTS

| | | | |
|---|---|---|---|
| 8,805,444 B2* | 8/2014 | Han et al. | 455/558 |
| 2002/0006808 A1* | 1/2002 | Onaka et al. | 455/550 |
| 2002/0103009 A1* | 8/2002 | Sato | 455/558 |
| 2002/0111180 A1* | 8/2002 | Hogan et al. | 455/518 |
| 2004/0209651 A1* | 10/2004 | Tsukamoto | 455/558 |
| 2005/0148366 A1* | 7/2005 | Okada | 455/558 |
| 2006/0116169 A1* | 6/2006 | Park | 455/558 |
| 2006/0203791 A1* | 9/2006 | Carrion-Rodrigo et al. | 370/338 |
| 2009/0111544 A1* | 4/2009 | Morrissey et al. | 455/575.9 |
| 2011/0034211 A1* | 2/2011 | Li | 455/558 |
| 2011/0077003 A1* | 3/2011 | Shin | 455/434 |
| 2011/0238532 A1* | 9/2011 | Zargahi | 705/27.1 |
| 2011/0296521 A1* | 12/2011 | Bernabeu | 726/19 |
| 2012/0225651 A1* | 9/2012 | Rysgaard | 455/435.1 |
| 2013/0017862 A1* | 1/2013 | Lee et al. | 455/558 |
| 2013/0170486 A1* | 7/2013 | Wang et al. | 370/342 |
| 2013/0231104 A1* | 9/2013 | Lindoff et al. | 455/422.1 |

* cited by examiner

METHOD FOR JUDGMENT AND RESIDENCY OF MULTI-CARD MOBILE TERMINAL SERVICE PROVIDER

CROSS-REFERENCES TO RELATED APPLICATIONS

This application claims the benefit of PCT Application No. PCT/CN2011/077415, filed Jul. 21, 2011, which is hereby incorporated by reference in their entirety.

FIELD OF INVENTION

The present invention relates to the field of mobile communication technology, in particular to the method for judgment and residency of multi-card mobile terminal service provider.

BACKGROUND OF THE INVENTION

The development of mobile communication engenders many systems of mobile communication network. For example, the second-generation mobile communication system (2G) involves Global System for Mobile Communication (GSM), General Packet Radio System (GPRS), Enhanced Data rates for GSM service (EDGE) and Code Division Multiple Access (CDMA); the third-generation mobile communication system (3G) includes Universal Mobile Telecommunications System (UMTS) (also named Wideband CDMA (WCDMA)) and Time Division-Synchronous CDMA (TD-SCDMA); and the next-generation mobile communication system u Long Term Evolution (LTE) and Worldwide Interoperability for Microwave Access (WIMAX).

Due to different network creation time and coverage of each wireless network, the application services provided by different operators and their expenses bear great differences. During the process of communication development, how to gain more users is crucial in market competition. Although the standard for current mobile network technology has not been unified yet, a mobile terminal configured with different user cards (viz. Subscriber Identity Module (SIM) hereinafter referred to as SIM card) to enable consumers to receive the application service of various networks and operators can be realized in technology and is required by consumers. Meanwhile, the same mobile terminal is configured with multiple SIM cards to share the service of the same network simultaneously (e.g. one SIM card is local and the other is nonlocal card for business trip or travel), which is also required by consumer. Therefore, user can use the mobile device supporting several SIM cards, and such SIM card can belong to either the same or different operators.

For mobile terminal with multi-card and multi-standby in the available technology, after starting up, the several user cards (e.g. SIM card) need to select cells for residency respectively after network searching, then each user card finishes registration on its own residency cell and conduct standby. However, each user card needs to have cell selected respectively for residency and registration although the several user cards comprised in mobile terminal belong to the same service provider, and the user card may reside at different cells finally, which additionally increases the difficulties in measurement, idle standby, synchronous maintenance and other technologies, thus leading to system instability and performance degradation.

BRIEF SUMMARY OF THE INVENTION

The present invention provides a method for the judgment and residency of multi-card mobile terminal service provider, so as to reduce the complexity of mobile terminal communication and optimize the performance of mobile terminal.

Some embodiments of the present invention provide a method for the determination of multi-card mobile terminal service provider, which comprises:
  acquiring the IMSI (International Mobile Subscriber Identification Number) corresponding to each card, and extracting from the IMSI the HPLMN (Home Public Land Mobile Network) or EHPLMN (Equal Home Public Land Mobile Network) corresponding to the card;
  acquiring information of affiliated country and operator corresponding to the card from the HPLMN or EHPLMN; and
  when the cards own the same affiliated operator, determining that they belong to the same service provider.

In an embodiment, the method for the judgment of the multi-card mobile terminal service provider also comprises: if the various cards belong to different operators, they acquire the service country of the mobile terminal; if the affiliated countries of some cards are different from the service countries, the cards with affiliated countries different from service countries are resided and registered in the network selected from those included in the operators corresponding to the cards with affiliated countries same as service countries. Then after successful registration, the cards with affiliated countries different from service countries and those with affiliated countries same as service countries belong to the same service provider.

In another embodiment, the method for the judgment of multi-card mobile terminal service provider also comprises: if the various cards belong to different operators, they acquire the service country of the mobile terminal; if both the affiliated countries and the service countries of the different cards are different, each of the cards is resided and registered in the network selected from those included in the operator of the service country. As long as two or more cards are registered successfully under the network of the same operator, the card registered successfully belongs to the same service operator.

In another embodiment, the method for the judgment of multi-card mobile terminal service provider also comprises: after starting-up residency of the mobile terminal, service provider of each card is acquired, and the service providers corresponding to all or partial cards, the affiliated operators and IMSI are stored in the Nonvolatile internal storage (NV) of the mobile terminal.

In another embodiment, the method for the judgment of multi-card mobile terminal service provider also comprises: before judging whether the plurality of cards belong to the same service provider, acquire IMSI of the current card in the mobile terminal, and retrieve the NV of the mobile terminal. When the IMSI of the card stored in the NV is the same as that of the current card and the affiliated operators of partial or all cards stored are also identical, the partial or all cards belong to the same service provider.

In another embodiment, the method for the judgment of multi-card mobile terminal service provider also comprises: before judging whether the plurality of cards belong to the same service provider, acquire the service country of the mobile terminal and IMSI of the current card, and retrieve the NV of the mobile terminal. When the IMSI of the card stored in the NV is the same as that of the current card and the service providers of partial or all cards stored belong to the service country and the service providers of the partial or all cards are also identical, the partial or all cards belong to the same service provider.

In another embodiment, the method for the judgment of multi-card mobile terminal service provider also comprises:

before judging whether the plurality of cards belong to the same service provider, acquire the service country of the mobile terminal and IMSI of the current card and retrieve the NV of the mobile terminal. When the IMSI of the card stored in the NV is the same as that of the current card, but the service providers of the different cards stored belong to the service country and the service providers of different cards are totally various, the plurality of cards belong to the different service providers.

In some embodiments, the present invention also provides a method for starting-up residency of multi-card mobile terminal, which comprises:

Starting up the mobile terminal;
Judging whether the plurality of cards belong to the same service provider;
Residing the cards belonging to the same service provider in the same cell if partial or all cards belong to the same service provider.
Optionally, judging whether the plurality of cards belong to the same service provider involves:
Acquiring the IMSI corresponding to each card, and extracting the HPLMN or EHPLMN corresponding to the card from the IMSI;
Acquiring the information of affiliated country and operator corresponding to the card from the HPLMN or EHPLMN;
Some1 or all cards belong to the same service provider if the affiliated operators of partial or all cards are identical.

In another embodiment, judging or determining whether the plurality of cards belong to the same service provider also involves: when the affiliated operators of the different cards are not identical, the service country of the mobile terminal is acquired; if the affiliated countries and service countries for part of the cards are different, the cards with affiliated countries different from the service countries are resided and registered in the network selected from those included in the operators corresponding to the cards with affiliated countries same as service countries. After successful registration, the cards with affiliated countries different from service countries and those with affiliated countries same as service countries belong to the same service provider.

In another embodiment, judging whether the plurality of cards belong to the same service provider also involves: when the affiliated operators of the different cards are not identical, the service country of the mobile terminal is acquired; if both the affiliated countries and the service countries of the different cards are different, each of the cards is resided and registered in the network selected from those included in the operator of the service country. As long as two or more cards are registered successfully under the network of the same operator, the cards registered successfully belong to the same service operator.

In another embodiment, the method for starting-up residency of multi-card mobile terminal also comprises: after starting-up residency of the mobile terminal, service provider of each of the cards is acquired, and the service providers corresponding to all or partial cards, the affiliated operators and IMSI are stored in NV of the mobile terminal.

In another embodiment, the method for starting-up residency of multi-card mobile terminal also comprises: before judging whether the plurality of cards belong to the same service provider, acquire IMSI of the current card in the mobile terminal, and retrieve the NV of the mobile terminal. When the IMSI of the card stored in the NV is the same as that of the current card and the affiliated operators of partial or all cards stored are also identical, the partial or all cards belong to the same service provider.

In another embodiment, the method for starting-up residency of multi-card mobile terminal also comprises: before judging whether the plurality of cards belong to the same service provider, acquire the service country of the mobile terminal and IMSI of the current card and retrieve the NV of the mobile terminal. When the IMSI of the card stored in the NV is the same as that of the current card and the service providers of partial or all cards stored belong to the service country and the service providers of the partial or all cards are also identical, the partial or all cards belong to the same service provider.

In another embodiment, the method for starting-up residency of multi-card mobile terminal also comprises: Before judging whether the plurality of cards belong to the same service provider, acquire the service country of the mobile terminal and IMSI of the current card and retrieve the NV of the mobile terminal. When the IMSI of the card stored in the NV is the same as that of the current card, but the service providers of the different cards stored belong to the service country and the service providers of different cards are totally different, the plurality of cards belong to the different service providers.

In some alternative embodiments, the present invention also provides a method for the residency of multi-card mobile terminal, including: residing the cards belonging to the same service provider in the same cell if partial or all cards belong to the same service provider.

In an embodiment, the residency in the same cell includes that the cards belonging to the same service provider are resided in the same cell if the cell is reselected or network is recovered.

Compared with conventional technologies, embodiments of the present invention can have one or more the following advantages:

1) In some embodiments of the present invention, the IMSI corresponding to each card is acquired, and the HPLMN or EHPLMN corresponding to the card is extracted from the IMSI so as to determine from card storage information rapidly and accurately whether the plurality of cards in the same mobile terminal belong to the same service provider, which enables the mobile terminal to cause the cards belonging to the same service provider reside in the same cell during starting-up stage, cell reselection or network recovery under the circumstance of the plurality of cards belonging to the same service provider, thus reducing the realization difficulties in measurement, idle standby, synchronous maintenance, etc., and stabilizing the system and optimizing the performance of mobile terminal.

2) Some embodiments of the present invention disclose the storage of affiliated operator, service provider and the corresponding IMSI information of the card, therefore user can retrieve whether previous judgment results are stored before judging whether different cards belong to the same service provider, so as to reduce the judgment time.

DETAILED DESCRIPTION OF THE INVENTION

To further illustrate the aforementioned characteristics and advantages of the present invention, the preferred embodiments of the present invention are described in details with reference to the attached figures. In the following descriptions, many details are provided to aid the understanding of the present invention. However, it is understood that the invention can also be implemented through other methods different from those described herein, so the present invention is not restricted by the embodiments listed below.

As described above in the background of the present invention, in the conventional technology, even the multiple user cards in a mobile terminal belong to the same service provider, cells shall be selected for each user card for residency, registration, etc., and the multiple user cards may ultimately be resided in different cells, which additionally increases the realization difficulties in measurement, idle standby, synchronous maintenance and other technologies, thus leading to system instability and performance degradation.

Embodiments of the present invention provide a method for the judgment and residency of multi-card mobile terminal service provider. Through rapidly and accurately judging whether the plurality of cards comprised in the mobile terminal belong to the same operator, the mobile terminal causes the cards belonging to the same service provider to reside in the same cell during starting-up stage, cell reselection or network recovery under the circumstance of two or more cards belonging to the same service provider, which reduces the realization difficulties in measurement, idle standby, synchronous maintenance and other technologies, thus stabilizing the system and optimizing the performance of mobile terminal.

Detailed descriptions will now be given in combination with the attached figures.

Embodiment I

Figure 1:
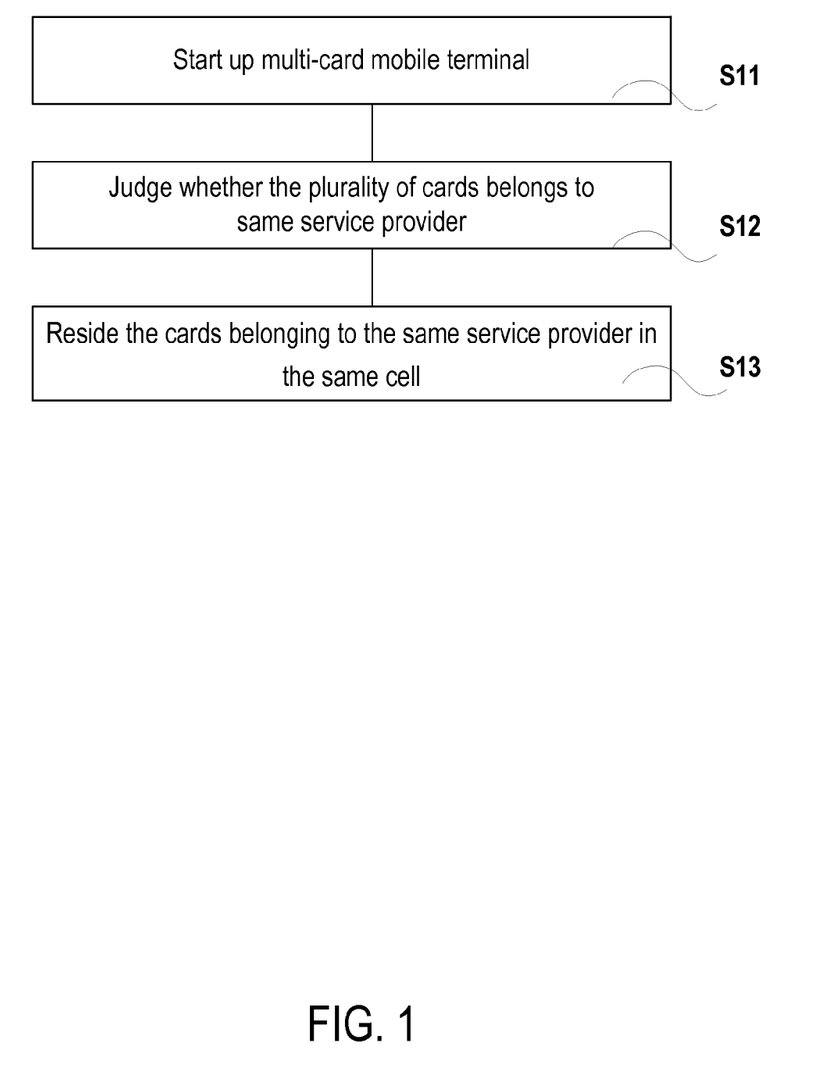
FIG. 1 is a flow diagram of a method for the starting-up residency of multi-card mobile terminal provided in Embodiment I of the present invention.

As shown in FIG. 1, the method for starting-up residency of multi-card mobile terminal according to an embodiment comprises:

Step S11: Start up the mobile terminal which includes several cards;

Step S12: Judge whether the multiple cards belong to the same service provider;

Step S13: Reside the cards belonging to the same service provider in the same cell if some or all cards belong to the same service provider.

It should be noted that the service country mentioned in the present invention refers to the country where the mobile terminal of the card is currently in, viz. the country actually providing service for it currently, and the affiliated country refers to the country of registering card, viz. the country it actually belongs to. For example, for a card registered in the USA, if its mobile terminal is in China, its service country is China and affiliated country is the USA, and if its mobile terminal is in the USA, both its affiliated country and service country refer to the USA. The service provider mentioned in the present invention refers to the operator actually providing service for the card currently, and the affiliated operator is the operator of registering the card. For example, as for a card registered in China Mobile, if its mobile terminal is in China, both its affiliated operator and service provider refer to China Mobile. If the card is in USA and after China Mobile signs internetworking protocol with T-Mobile of the USA, its affiliated operator is China Mobile and its service provider refers to T-Mobile of the USA. Thus it can be seen that, for a card, both its affiliated country and affiliated operator remain unchanged, but the service country and service provider actually providing service for it may change.

Figure 2:
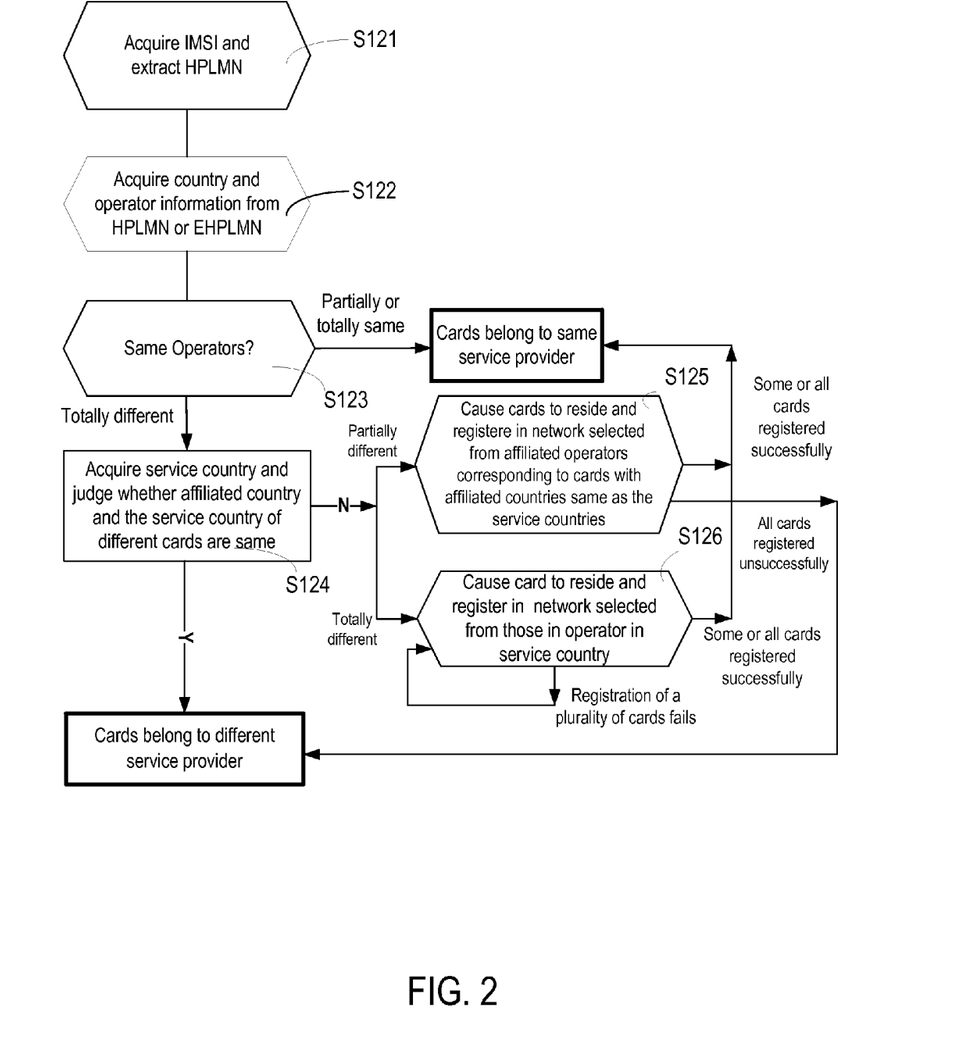
FIG. 2 is a flow diagram of a method for the judgment of multi-card mobile terminal service provider provided in Embodiment I of the present invention.

FIG. 2 is a flow diagram illustrating a method for judging whether multi-card belongs to the same service provider after starting up the mobile terminal. The method comprises:

Step S121: Acquire IMSI corresponding to each card and extract the HPLMN or EHPLMN corresponding to the card from the IMSI;

Step S122: Acquire information of affiliated country and operator corresponding to the card from the HPLMN or EHPLMN;

Step S123: Judge whether the affiliated operators of the different cards are the same. When affiliated operators of some or all cards are the same, such cards belong to the same service provider if affiliated operator of each card is not identical, step S124 will be carried out;

Step S124: Acquire the service country of the mobile terminal, and judge whether the affiliated countries of different cards are the same as their service countries. If identical, the cards belong to different service providers. if the affiliated countries of some of the cards are different from the service countries, step S125 will be carried out; if the affiliated countries of all the different cards are totally different from the service countries, step S126 will be carried out;

Step S125: Make the cards with affiliated countries different from service countries resided and registered in the network selected from those included in the operators corresponding to the cards with affiliated countries same as service countries. After successful registration of some or all cards, the cards with affiliated countries different from service countries and those with affiliated countries same as service countries belong to the same service provider; in case of total registration failure, the plurality of cards belong to different service providers;

Step S126: Make each of the cards resided and registered in the network selected from those included in the operators corresponding to the service countries. If some or all cards are registered successfully in the network of the same operator, some or all cards registered successfully belong to the same service provider, if multi-card fails in registration, the multiple cards with failed registration are registered in the network selected from those included in another operator corresponding to the service country of the mobile terminal, until only one card fails in registration or network selection and registration have been conducted for the networks comprised in all operators corresponding to the service country of the mobile terminal.

Specifically, for simplicity, take the mobile phone with the mobile terminal including two SIM cards as an example to explain each step of the above method of judging whether two SIM cards belong to the same service provider in the embodiment. It should be noted that in other embodiments of the present invention, the mobile terminal also can be any of notebook computer, POS machine or auto PC as long as the mobile terminal comprises two or more cards; the card also can be UIM (User Identifier Module) card or USIM (Universal Subscriber Identity Module) card, etc., which is decided by specific network.

First, step S121 is carried out to acquire a primary IMSI of a primary SIM card and a secondary IMSI of a secondary SIM card, and extract the primary HPLMN corresponding to the primary SIM card from the primary IMSI and the secondary HPLMN corresponding to the secondary SIM card from the secondary IMSI.

Therein, an IMSI (International Mobile Subscriber Identification Number) is the only identification of each SIM card, and the specific information is stored in the corresponding SIM card to differentiate effective information of mobile subscribers. IMSI is comprised of an MCC, an MNC, and an MSIN with the total length of 15 digits, and adopts the coded-decimal notation, wherein, MCC means a country's mobile code, which is used to identify the country of mobile subscribers and is comprised of 3 digits, and China's MCC is 460; MNC means mobile network code, which is used to identify the mobile communication network of mobile subscribers (hereinafter referred to as the actual operator) and is comprised of 2 digits, and China Mobile's MNC is 00, 02 or 07, China Unicorn's MNC is 01 and China Telecom's MNC is 03; MSIN means mobile subscriber identification number, which is used to identify mobile subscribers in a certain mobile communication network and is comprised of 10 digits.

Here, the HPLMN (Home Public Land Mobile Network) is comprised of MCC and MNC, that is to say, HPLMN is uniquely determined by MCC and MNC. HPLMN is divided based on a mobile network code of the country and the actual operator. A TD-SCDMA card has an equivalent PLMN (namely EPLMN), thus for the TD-SCDMA card, HPLMN acquisition can be replaced by acquisition of an equivalent HPLMN list (namely an EPLMN list) in the card to select a residency, which shall not restrict the protective scope of the present invention.

Then, step S122 is carried out to obtain the affiliated operator of the primary SIM card based on the primary HPLMN and the affiliated operator of the secondary SIM card based on the secondary HPLMN.

Specifically, the HPLMN corresponding to China Mobile's GSM network is 46000 and 46002, wherein, the number section corresponding to 46000 ranges from 135 to 139; the number section corresponding to 46002 refers to 1340~1348, 150, 151, 158 and 159. The HPLMN corresponding to China Mobile's TD-SCDMA network is 46007, the corresponding number section refers to 147, 152, 157, 187 and 188. The HPLMN corresponding to China Unicorn's GSM network is 46001, the corresponding number section refers to 130~132, 155 and 156. The HPLMN corresponding to China Telecom's CDMA network is 46003, the corresponding number section refers to 133, 1349, 153, 180 and 189.

The affiliated operator of each SIM card can be judged according to the HPLMN of the card. The MCC and MNC included in an IMSI of the terminal USIM card are consistent with MCC and MNC on the HPLMN. For a certain subscriber, there is only one attributive HPLMN.

At step S123, if the affiliated operators of two SIM cards are the same, the plurality of SIM cards belong to the same service provider; otherwise, implement step S124.

As a specific embodiment, if both affiliated operators of two SIM cards refer to China Unicom, the two SIM cards belong to the same service provider no matter whether the cell phone using the two SIM cards is in China or other countries. For example, if the cell phone is used in America, China Unicom provides services for the two SIM cards of the cell phone through an agreement with an American communication operator certainly. That is to say, it is the same service provider who provides the service for the two SIM cards.

The primary and secondary SIM cards are on the same mobile terminal, therefore, service country information of two SIM cards is the same and the service country of SIM cards refers to the service country of the mobile terminal. Service country information of the mobile terminal corresponding to each SIM card mentioned above can be stored in the NV (Nonvolatile internal storage) of the mobile terminal. For example: if the affiliated country of the cell phone corresponding to two SIM cards is China, the service country of the cell phone is defaulted as China. If the cell phone enters America or is about to enter America, service country information of the cell phone can be changed from China to America; after the cell phone returns to China from America, service country information of the cell phone is changed from America to China accordingly.

It should be noted that if not all providers of all cards included in a mobile terminal are the same, step S124 can be implemented. For example: if the mobile terminal includes 4 cards, the 4 cards belong to different affiliated operators, and 3 or 2 different affiliated operators can continue to implement step S124.

At step S124, the method acquires the service country of a mobile terminal of the primary and secondary SIM cards from the NV of the mobile terminal. If the affiliated countries of the primary and secondary SIM cards are the same as the service country, a plurality of SIM cards belong to different service providers. If the affiliated country of the primary SIM card is the same as the service country but the affiliated country of the secondary SIM card is different from the service country, the method implements step S125. If the affiliated countries of the primary and secondary SIM cards are different from the service country, the method implements step S126;

As a first specific embodiment, if the HPLMN of the primary SIM card is 46002, that is to say, the affiliated operator of the primary SIM card is China Mobile. The HPLMN of the secondary SIM card is 46003, that is to say, the affiliated operator of the secondary SIM card is China Telecom. If the service country at the mobile terminal is China, then the countries of the primary and secondary SIM cards are the same as the service country. However, the affiliated operators of the primary and secondary SIM cards are different, thus such cards belong to different service providers.

As a second specific embodiment, if the HPLMN of the primary SIM card is 46002, that is to say, the affiliated operator of the primary SIM card is China Mobile, and the HPLMN of the secondary SIM card is 26202, that is to say, the affiliated operator of the secondary SIM card is Vodafone Mobilefunk. If the service country of the mobile terminal is China, the affiliated country of the primary SIM card is the same as the service country, while the affiliated country of the secondary SIM card is different from the service country. It is necessary to judge whether the service providers of the primary and secondary SIM cards are the same through judging whether China Mobile has signed an interconnection agreement with Vodafone Mobilefunk of Germany. Thus step S125 shall be implemented, that is to say, enable the secondary SIM card to undergo the residency and registration of the network selection for the network (a TD-SCDMA network specifically) included in China Mobile corresponding to the primary SIM card. If the registration of the secondary SIM card succeeds, it shows that China Mobile has signed an interconnection agreement with Vodafone Mobilefunk of Germany, and the primary and secondary SIM cards belong to the same service provider; if the registration of the secondary SIM card fails, it shows that China Mobile has not signed an interconnection agreement with Vodafone Mobilefunk of Germany, and the primary and secondary SIM cards belong to different service providers.

As the third specific embodiment, if the HPLMN of the primary SIM card is 46002, that is to say, the affiliated operator of the primary SIM card is China Mobile, and the HPLMN of the secondary SIM card is 26202, that is to say, the affiliated operator of the secondary SIM card is Vodafone Mobilefunk of Germany. If the service country of the mobile terminal is America, the affiliated country of the primary and secondary SIM cards are different. It is necessary to judge whether the service providers of the primary and secondary SIM cards are the same through determining whether China Mobile and Vodafone Mobilefunk have separately signed an interconnection agreement with the same American communication operator. Thus step S126 shall be implemented, that is to say, enable the primary and secondary SIM cards to undergo the residency and registration of the network selection for the network included in any of American operators separately. Specifically, enable the primary and secondary SIM cards to undergo the registration of the same network included NEXTEL of America. If the registrations of the primary and secondary SIM cards succeed, it shows that China Mobile and Vodafone Mobilefunk have separately signed an interconnection agreement with the same American communication operator, then the primary SIM card and the secondary SIM card belong to the same service provider; if the registration of the primary SIM card succeeds and that of the secondary SIM card fails, it shows that only China Mobile has signed an interconnection agreement with NEXTEL of America, then the primary SIM card and the secondary SIM card belong to different service providers; if both the registrations of the primary and secondary SIM cards fail, it shows that both China Mobile and Vodafone Mobilefunk have not signed an interconnection agreement with NEXTEL of America. At this time, it is necessary for the primary and secondary SIM cards to launch registration to the same network included in another American communication operator separately, with the same specific analysis as above, until the registrations of the two SIM cards succeed or the registration of one SIM card succeeds and that of the other fails.

In step S126, there are no restrictions on the sequence of residency and registration of the primary SIM card and the secondary SIM card in the network selected from those included in different operators of the service country.

It should be noted that those skilled in the field are familiar with the specific network included in each operator and it will not be repeated. Moreover, the network included in each operator shall not restrict the protective scope of the present invention with constant changes of the operator's technology and business.

At this point, the judgment on whether the primary and secondary SIM cards belong to the same service provider is completed.

Finally, at step S13, if the primary and secondary SIM cards belong to the same service provider, the method resides the two SIM cards in the same cell; otherwise, enable the primary and secondary SIM cards to find a network for residency and finish the registration on the cells where they reside separately.

Specifically, some of the cards in the multi-card of the same service provider can reside in the same cell during residency. Preferably, the method enables all cards of the same service provider to reside in the same cell, thus minimizing the difficulty for a system in measurement, idle standby, synchronous maintenance and other aspects and ensuring a more stable system.

It should be noted that if a mobile terminal is comprised of three or more cards, the judgment can be conducted in reference to the afore-mentioned method and the cards of the same operator switch over and reside in the same cell. If two or more cards belong to the same service provider, the registration of such cards shall be completed in the same cell. For example, if the service country of a mobile terminal is China and five cards are included, the service providers of the primary and secondary SIM cards are China Mobile, the service provider of the third card is China Telecom, and the service providers of the fourth and fifth cards are China Unicom, it is necessary to make the primary and secondary SIM cards, and the fourth and fifth cards reside in the same cell separately.

Through quickly and accurate judging whether a plurality of cards included in a mobile terminal belong to the same operator in this embodiment, if a plurality of cards belong to the same service provider, the mobile terminal enables a plurality of cards belonging to the same service provider to reside in the same cell, so as to reduce the difficulty in measurement, idle standby, synchronous maintenance and other aspects, ensure a more stable system and optimize the performance of the mobile terminal; increase the judgment process of the service provider of SIM cards if the mobile terminal roams in different countries, thus expanding the application scope and ensuring an accurate judgment process.

Embodiment II

In this embodiment, a method for determining whether the plurality of cards belong to the same service provider includes the following steps. In Step S221, the method acquires IMSI of current card in the mobile terminal and retrieves NV of the mobile terminal. If IMSI of the card stored in the NV is the same as that of current card and affiliated operators of the stored partial or all cards are also the same, some or all cards belong to the same service provider. If IMSI of the card stored in the NV is the same as that of current card, and service providers of the stored partial or all cards belong to the service country and service providers of the partial or all cards are the same, the partial or all cards belong to the same service provider. If IMSI of the card stored in the NV is the same as that of current card, the service providers of the stored different cards belong to the service country, and if service providers of the stored different cards are totally different, the plurality of cards belongs to different service providers. In cases other than the above cases, the method implements step S222.

Figure 3:
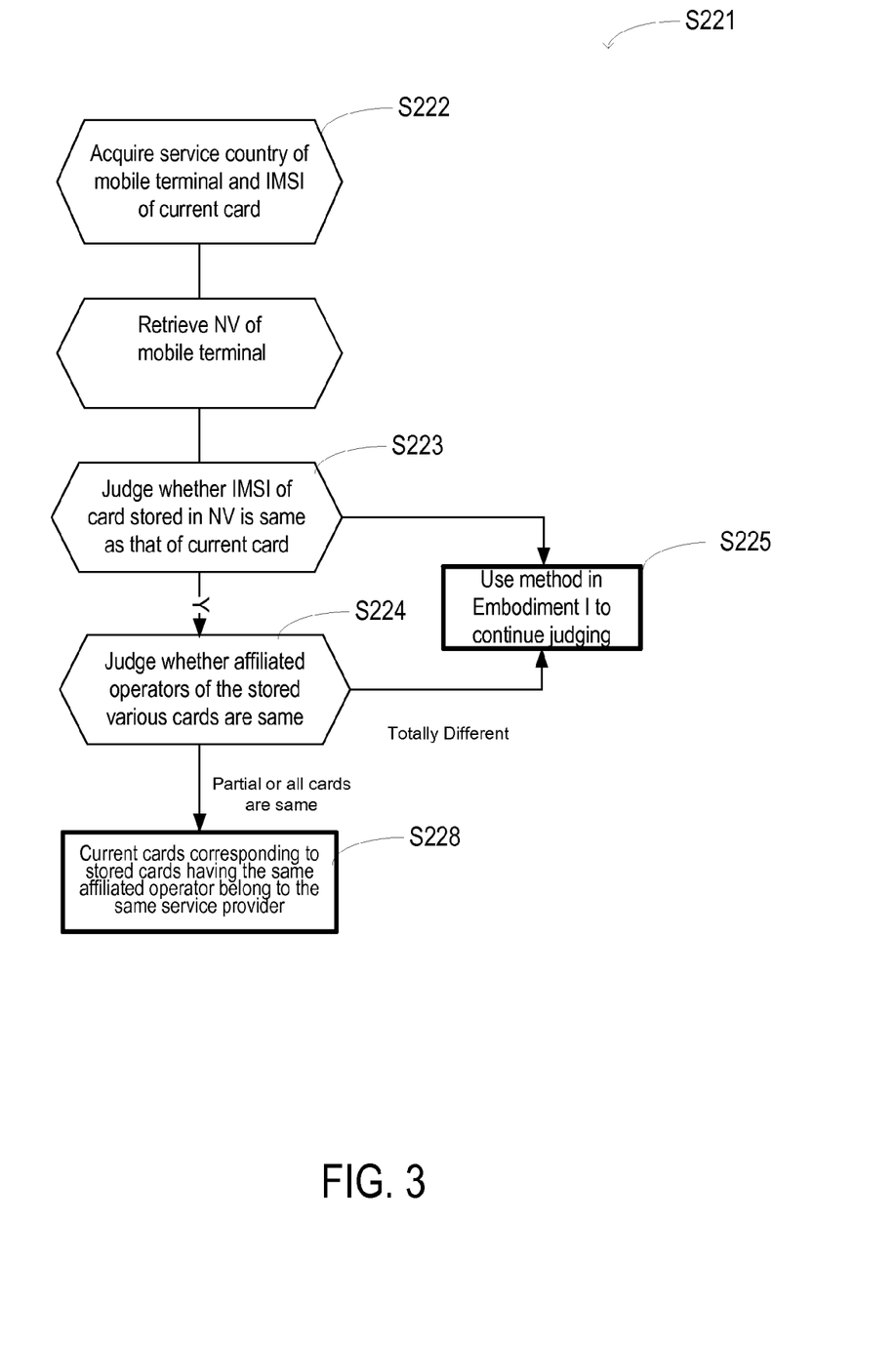
FIG. 3 is a partial flow diagram of the method for the judgment of multi-card mobile terminal service provider provided in Embodiment II of the present invention.

FIG. 3 is a flow diagram illustrating an example of Step S221. As shown in FIG. 3, the method includes that following steps: acquire service country of the mobile terminal and IMSI of current card; retrieve NV of the mobile terminal; judge whether IMSI of the card stored in the NV is the same as that of current card; if they are not same, adopt the method in Embodiment I to judge continually; if they are the same, further judge whether affiliated operators of the stored different cards are the same; if affiliated operators of the stored partial or all cards are the same, a plurality of current cards corresponding to a plurality of stored cards the same as affiliated operator belong to the same service provider; if affiliated operators of the stored different cards are totally different, adopt the method in Embodiment I to make a further judgment.

Figure 4:
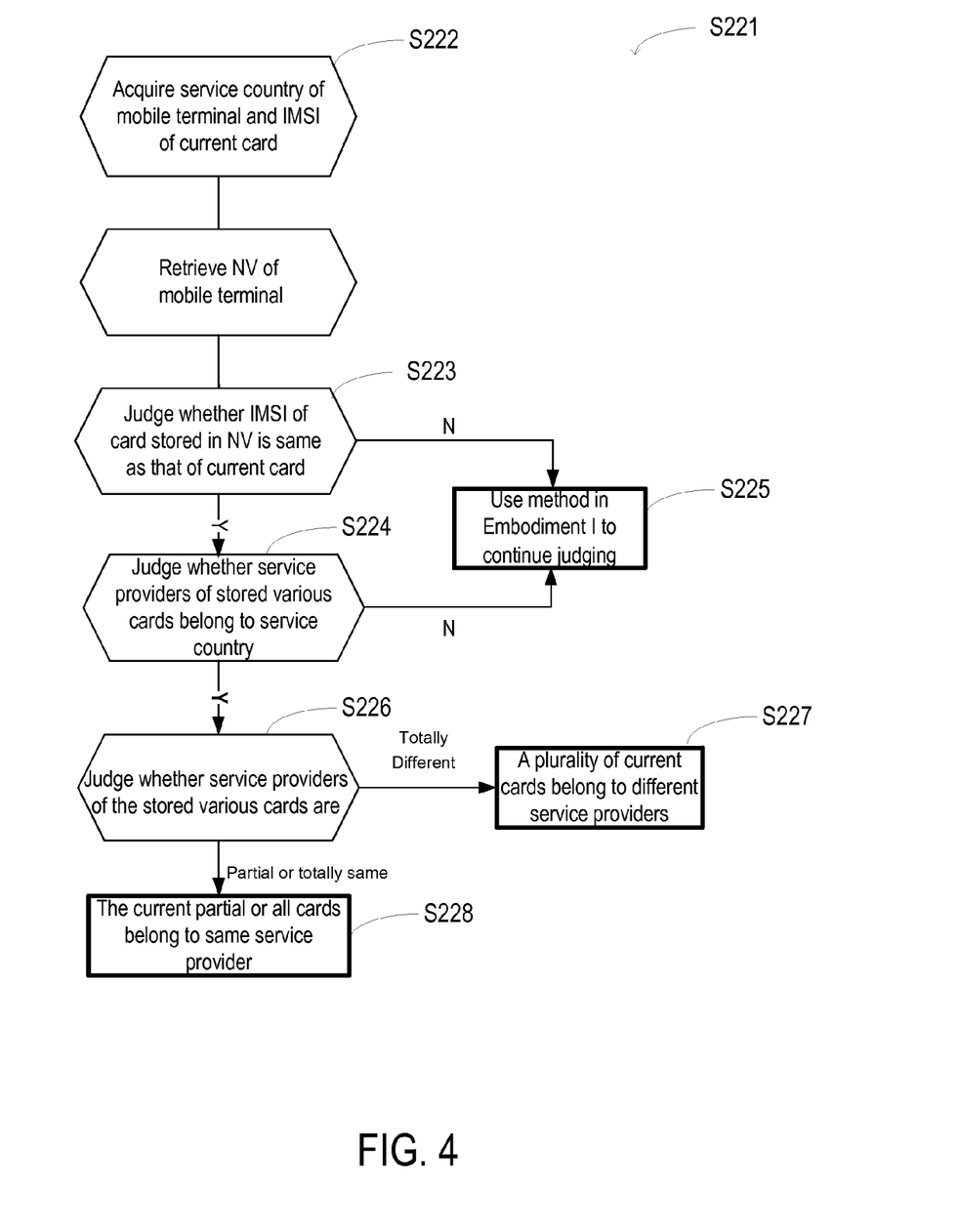
FIG. 4 is another partial flow diagram of the method for the judgment of multi-card mobile terminal service provider provided in Embodiment II of the present invention.

FIG. 4 is a flow diagram illustrating another example of Step S221. As shown in FIG. 3, the method includes that following steps: acquire service country of the mobile terminal and IMSI of current card; retrieve NV of the mobile terminal; judge whether IMSI of the card stored in the NV is the same as that of current card; if they are not same, adopt the method in Embodiment I to judge continually; if they are the same, further judge whether the service providers of the stored different cards belong to the service country; if not all service providers of the stored different cards belong to the service country, adopt the method in Embodiment I to judge continually; if all service providers of the stored different cards belong to the service country, further judge whether all service providers of the stored different cards are the same; if the service providers of the stored different cards are different, the plurality of current cards belongs to different service providers; if service providers of the stored partial or all cards are the same, the current partial or all corresponding cards belong to the same service provider.

At Step S222, the method acquires IMSI corresponding to each current card and extract HPLMN corresponding to current card from the IMSI.

At Step S223, the method acquires the information about affiliated country and affiliated operator corresponding to the card from HPLMN or EHPLMN.

At Step S224, the method determines whether affiliated operators of the different cards are the same. If some or all cards belong to the same operator, the partial or all cards belong to the same service provider; if affiliated operators of all cards are not identical, the method implements step S225.

At Step S225, the method acquires service country of the mobile terminal and judge whether affiliated country and the service country of different cards are the same. If they are identical, the plurality of cards belongs to different service providers; if affiliated countries and the service countries of the partial cards are different, the methods implements step S226. If affiliated countries and the service countries of different cards are totally different, the method implements step S227.

At Step S226, the method makes cards with affiliated countries different from the service countries resided and registered in the network selected from those included in affiliated operators corresponding to cards with affiliated countries same as the service countries. If partial or all them are registered successfully, the cards with affiliated countries different from service countries and the cards with affiliated countries same as service countries belong to the same service provider. If the registration of all them fails, the plurality of cards belongs to different service providers.

At Step S227, the method makes each card resided and registered in the network selected from those included in operator corresponding to the service country. If partial or all cards are registered successfully under the network of the same operator, the partial or all cards registered successfully belong to the same service provider; if the registration of a plurality of cards fails, continue to make a plurality of cards registered unsuccessfully resided and registered in the network selected from those included in another operator corresponding to the service country of the mobile terminal, till there is only one card registered unsuccessfully or the network selection and registration are conducted in networks included in all operators corresponding to the service country of the mobile terminal.

At Step S228, after starting-up residency of the mobile terminal, the method acquires the service provider of each current card and store service provider, affiliated operator and IMSI corresponding to partial or all current cards in NV of the mobile terminal.

Step S222 to step S227 in this embodiment are respectively similar to step S121 to step 126 in Embodiment I and no further detail will be given here. Step S221 and step S228 are explained below using a mobile terminal including two SIM cards as the example. SIM cards included in the mobile terminal may change and the number of SIM cards also may change. Hereinafter SIM cards stored in NV of the mobile terminal are respectively entered as the primary storage SIM card and the secondary storage SIM card, while SIM cards currently configured in the mobile terminal are entered as the primary current SIM card and the secondary current SIM card.

In the afore-mentioned step S221, the method first acquires service country of the mobile terminal, IMSI of the primary current SIM card, and IMSI of the secondary current SIM card. If IMSI of the primary storage SIM card and that of the secondary storage SIM card stored in NV of the mobile terminal are equal to IMSI of the primary current SIM card and that of the secondary current SIM card correspondingly, it indicates that the information stored in the NV are those of current SIM card. Otherwise, it is necessary to directly adopt the method in Embodiment I for making a subsequent judgment.

In a specific embodiment, if IMSI of the primary storage SIM card and that of the secondary storage SIM card stored in NV of the mobile terminal are equal to IMSI of the primary current SIM card and that of the secondary current SIM card correspondingly, the method further judges whether the service providers of the primary and secondary storage SIM cards belong to the service country of the mobile terminal. If both belong to the service country of the mobile terminal and service providers of different SIM cards stored in NV are the same, it indicates that the primary and secondary current SIM cards belong to the same service provider. For example, the IMSI of the primary storage SIM card is equal to that of the primary current SIM card, IMSI of the secondary storage SIM card is equal to that of the secondary current SIM card, the service provider of the primary storage SIM card is China Mobile, that of the secondary storage SIM card is also China Mobile, the service country of the mobile terminal is China, and China Mobile belongs to China, so the primary and secondary current SIM cards belong to the same service provider.

In another specific embodiment, if the IMSI of the primary storage SIM card and that of the secondary storage SIM card stored in NV of the mobile terminal are equal to the IMSI of the primary current SIM card and that of the secondary current SIM card correspondingly, the method further judges whether affiliated operators of the primary and secondary storage SIM cards are the same. If they are the same, it indicates that the primary and secondary current SIM cards belong to the same service provider. For example, IMSI of the primary storage SIM card is equal to that of the primary current SIM card, IMSI of the secondary storage SIM card is equal to that of the secondary current SIM card, affiliated operator of the primary storage SIM card is China Mobile and that of the secondary storage SIM card is also China Mobile, no matter whether the service country of the mobile terminal is China or other countries, then the method determines that the primary and secondary current SIM cards belong to the same operator.

In a third specific embodiment, if IMSI of the primary storage SIM card and that of the secondary storage SIM card stored in NV of the mobile terminal are equal to IMSI of the primary current SIM card and that of the secondary current SIM card correspondingly, the method further judges whether the service providers of the primary and secondary storage SIM cards are the same and belong to the service country of the mobile terminal. If the service providers of the primary and secondary storage SIM cards are different but belong to the service country, the primary and secondary current SIM cards belong to different service providers. For example, IMSI of the primary storage SIM card is equal to that of the primary current SIM card, IMSI of the secondary storage SIM card is equal to that of the secondary current SIM card, the service provider of the primary storage SIM card is China Mobile, that of the secondary storage SIM card is China Unicom and the service country of the mobile terminal is China, so the primary and secondary current SIM cards belong to different service providers.

In other cases, a plurality of current SIM cards shall be judged one by one in accordance with the method in Embodiment I.

At step S228, after starting-up residency of the mobile terminal, the method replaces service provider, affiliated operator and IMSI corresponding to the primary storage SIM card or/and the secondary storage SIM card in NV of the mobile terminal with service provider, affiliated operator and IMSI corresponding to the primary current SIM card or/and the secondary current SIM card.

In other embodiments of the present invention, if service provider, affiliated operator and IMSI of the current SIM card are the same as those of the storage SIM card, such replacement may not be required. This embodiment increases the storage of service provider information of SIM card and corresponding IMSI information, thus if judging whether the primary and secondary SIM cards belong to the same service provider, it is allowed to first retrieve whether the previous judgment results are stored, if yes, the time for judgment will be shortened further.

It should be noted that a mobile terminal of two cards is used as example both in Embodiment I and Embodiment II. In other embodiments of the present invention, the mobile terminal also can include more than two cards. So long as the two or more cards included in the mobile terminal belong to the same service provider, these cards can reside in the same cell, but not only that all cards belong to the same service provider.

Correspondingly, the present invention also provides a method for the judgment of service provider of multi-card mobile terminals. Such method is described above with reference to the steps for judging whether a plurality of cards belong to the same service provider in Embodiment I and Embodiment II for details.

Correspondingly, the present invention also provides a method for the residency of multi-card mobile terminal, in which if partial or all cards belong to the same service provider, the cards belonging to the same service provider will reside in the same cell.

Figure 5:
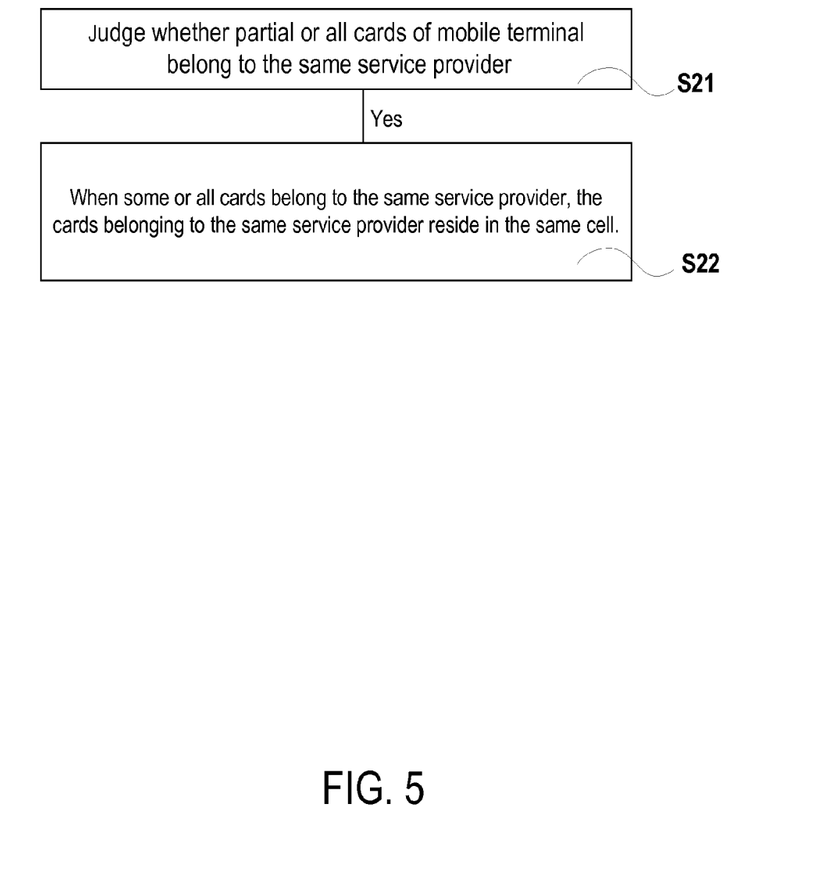
FIG. 5 is a flow diagram of the method for residency of multi-card mobile terminal provided in embodiment of the present invention.

FIG. 5 is a flow diagram illustrating a method provided by the embodiments of the present invention for the residency of multi-card mobile terminal. The method includes steps S21 and S22 as described below.

At Step S21, the method judges whether some or all cards of mobile terminal belong to the same service provider.

Specifically, the methods in the Embodiment I and Embodiment II or other methods can be adopted for judging whether some or all cards of mobile terminal belong to the same service provider. It is understood that the some or all cards can include two or more cards.

At Step S22, if some or all cards belong to the same service provider, during cell reselection or network recovery, the cards belonging to the same service provider will reside in the same cell. Here, the residency in the same cell can be illustrated with two examples.

In the first case, after cell reselection and the subsequent cell switch for cards of the same mobile terminal, the cards belonging to the same service provider will reside in the same cell. For example, if the same mobile terminal includes two cards of China Mobile, then after the cell reselection and cell switch are finished for the two cards of China Mobile, the method makes the two cards reside in the same cell. It should be noted that, before cell reselection, the two cards of China Mobile can reside either in the same cell or in different cells, which does not limit the protection scope of the present invention.

In the second case, during network recovery for cards of the same mobile terminal, the method makes the cards belonging to the same service provider reside in the same cell. The network recovery refers to the process of network searching for mobile terminal to get from network-unavailable status (blind zone) into network available status. For example, in the process that the mobile terminal gets from network-available status into network-unavailable status and then gets from network-unavailable status into network available status, the card of the mobile terminal requires network searching and residency. At this time, the cards in the mobile terminal which belong to the same service provider will reside in the same cell.

It should be noted that, before network recovery, the cards belonging to the same service provider can reside either in the same cell or in different cells, which does not limit the protection scope of the present invention.

If a plurality of cards included in the mobile terminal belong to different service providers respectively, the method provided in the present invention for the residency of multi-card mobile terminal is not applicable, and network selection and residency will be conducted for each card separately. So finally the cards will reside in different cells.

At this time, the residency of cards belonging to the same service provider in the same cell is applicable not only at the stage of starting-up residency, but also in the process of cell reselection and network recovery, which also reduces the difficulty in realizing measurement, idle standby, synchronous maintenance, etc. and also makes the system more stable and optimizes the performance of the mobile terminal.

The present invention has been disclosed through the preferred embodiments as above, but such embodiments are not used to limit the present invention. Technical personnel of the field, within the spirit and scope of the present invention, can use the methods and technical contents disclosed above to make possible changes and modifications to technical solution of the present invention. Therefore, all contents within the scope of technical solution of the present invention and any modifications, equivalent changes and embellishment to the above embodiments made in accordance with technical essence of the present invention are within the scope of the present invention.

What is claimed is:

1. A method for determining a service provider of a multi-card mobile terminal having two or more cards, comprising:
    acquiring an IMSI (International Mobile Subscriber Identification Number) corresponding to each card;

extracting an HPLMN (Home Public Land Mobile Network) or an EHPLMN (Equal Home Public Land Mobile Network) corresponding to the card from the IMSI;

acquiring information about an affiliated country and an affiliated operator corresponding to the card from the HPLMN or EHPLMN; and when affiliated operators of the cards are the same, determining that the cards belong to a same service provider;

when affiliated operators of the cards are not identical, acquiring a service country of the mobile terminal;

identifying cards for which affiliated countries and service countries are totally different, and causing said identified cards to be resided and registered in a network selected from those included in affiliated operators corresponding to cards for which affiliated countries are the same as service countries;

after successful registration of some or all of the cards, determining that the cards with the affiliated countries different from the service countries and those with the affiliated countries the same as the service countries belong to the same service provider; and after registration failure of some or all of the cards, the cards with failed registration are registered in the network selected from those included in an operator corresponding to the service country of the mobile terminal, wherein the operator corresponding to the service country of the mobile terminal is different than the affiliated operator corresponding to each card with failed registration.

2. The method of claim 1, further comprising:
when affiliated operators of the cards are not identical, acquiring a service country of the mobile terminal;
identifying cards for which affiliated countries and service countries are partially different, and causing said identified cards to be resided and registered in a network selected from those included in affiliated operators corresponding to cards for which affiliated countries are the same as service countries;
after successful registration of some or all of the cards, determining that the cards with the affiliated countries different from the service countries and those with the affiliated countries the same as the service countries belong to the same service provider; and
after registration failure of some or all of the cards, determining that the cards with the affiliated countries different from the service countries and those with the affiliated countries the same as the service countries belong to different service providers.

3. The method of claim 1, further comprising:
when affiliated operators of the cards are not identical, acquiring a service country of the mobile terminal;
when affiliated countries and the service countries of the cards are different, causing each card to be resided and registered in a network selected from those included in operators of the affiliated countries; and
when two or more cards are registered under the network of the same operator, determining that the cards registered successfully belong to the same service provider.

4. The method of claim 1, further comprising:
acquiring a service provider of each card; and
storing the service providers, affiliated operator, and IMSI corresponding to a plurality of cards in an NV (Non-volatile internal storage) of the mobile terminal.

5. The method of claim 4, further comprising:
before determining whether the cards belong to the same service provider, acquiring an IMSI of a first card in the mobile terminal and retrieving the IMSI from the NV of the mobile terminal; and
when the IMSI of the plurality of cards stored in the NV is the same as that of the first card and affiliated operators of some or all of the stored cards are also the same, determining that some or all of the cards belong to the same service provider as the first card.

6. The method of claim 4, further comprising:
before determining whether the cards belong to the same service provider, acquiring a service country of the mobile terminal and an IMSI of a first card, and retrieving the IMSI from the NV of the mobile terminal;
when the IMSI of the plurality of cards stored in the NV is the same as that of the first card, and service providers of some or all of the stored cards belong to the service country and service providers of some or all of the cards are also identical to the service provider of the first card, determining that some or all of the stored cards belong to the same service provider as the first card; and
when the IMSI of the plurality of cards stored in the NV is not the same as that of the first card, and service providers of some or all of the stored cards belong to the service country and service providers of some or all of the stored cards are not identical to the service provider of the first card, determining that some or all of the stored cards belong to different service providers than the first card.

7. The method of claim 4, further comprising:
before determining whether the cards belong to the same service provider, acquiring a service country of the mobile terminal and an IMSI of the first card, and retrieving the IMSI from the NV of the mobile terminal; and
when the IMSI of the plurality of cards stored in the NV is the same as that of the first card and service providers of the plurality of cards stored belong to different service countries than the service country of the first card, determining that the plurality of cards belong to different service providers than the first card.

8. A method for starting-up residency of a multi-card mobile terminal, comprises:
starting up the mobile terminal;
determining whether a plurality of cards in the multi-card mobile terminal belongs to a same service provider, wherein determining whether the plurality of cards belongs to the same service provider comprises:
acquiring an IMSI (International Mobile Subscriber Identification Number) corresponding to each card;
extracting an HPLMN (Home Public Land Mobile Network) or an EHPLMN (Equal Home Public Land Mobile Network) corresponding to the card from the IMSI;
acquiring information about an affiliated country and an affiliated operator corresponding to the card from the HPLMN or EHPLMN; and
when some or all cards belong to the same operator, determining that they belong to the same service provider;
identifying which cards belong to the same service provider; and
causing the cards belonging to the same service provider to reside in a same cell;
when affiliated operators of the cards are not identical, acquiring a service country of the mobile terminal;

identifying cards for which affiliated countries and service countries are totally different, and causing said identified cards to be resided and registered in a network selected from those included in affiliated operators corresponding to cards for which affiliated countries are the same as service countries;

after successful registration of some or all of the cards, determining that the cards with the affiliated countries different from the service countries and those with the affiliated countries the same as the service countries belong to the same service provider; and after registration failure of some or all of the cards, the cards with failed registration are registered in the network selected from those included in an operator corresponding to the service country of the mobile terminal, wherein the operator corresponding to the service country of the mobile terminal is different than the affiliated operator corresponding to each card with failed registration.

9. The method of claim 8, wherein determining whether the plurality of cards belongs to the same service provider further comprises:

when affiliated operators of the cards are not identical, acquiring a service country of the mobile terminal;

when affiliated countries and the service countries of all or some of the cards are different, causing cards with the affiliated countries different from the service countries to be resided and registered in a network selected from those included in affiliated operators corresponding to cards with affiliated countries the same as the service countries;

after successful registration of some or all of the cards, determining that the cards with the affiliated countries different from the service countries and those with the affiliated countries the same as the service countries belong to the same service provider; and after registration failure of some or all of the cards, determining that the cards with the affiliated countries different from the service countries and those with the affiliated countries the same as the service countries belong to different service providers.

10. The method of claim 8, wherein determining whether the plurality of cards belongs to the same service provider further comprises:

when affiliated operators of the cards are not identical, acquiring a service country of the mobile terminal;

when affiliated countries and the service countries of the cards are totally different, causing each card to be resided and registered in a network selected from those included in operators of the affiliated countries; and when two or more cards are registered successfully under the network of the same operator, determining that the cards registered successfully belong to the same service provider.

11. The method of claim 8, further comprising:

acquiring a service provider of each card; and storing the service provider, affiliated operator, and IMSI corresponding to some or all of the cards in an NV (Non-volatile internal storage) of the mobile terminal.

12. The method of claim 11, further comprising:

before determining whether the plurality of cards belongs to the same service provider, acquiring an IMSI of a first card in the mobile terminal and retrieving the IMSI from the NV (Non-volatile internal storage) of the mobile terminal;

when the IMSI of the plurality of cards stored in the NV is the same as that of the first card and affiliated operators of some or all of the stored cards are also the same as the affiliated operator of the first card, determining that the some or all of the stored cards belong to the same service provider as the first card.

13. The method of claim 11, further comprising:

acquiring a service country of the mobile terminal and the IMSI of a first card and retrieving the IMSI from the NV of the mobile terminal;

when the IMSI of the plurality of cards stored in the NV is the same as that of the first card, and service providers of some or all of the stored cards belong to the service country and service providers of some or all of the stored cards are also identical to the service provider of the first card, determining that some or all of the stored cards belong to the same service provider as the first card; and when the IMSI of the plurality of cards stored in the NV is not the same as that of the first card, and service providers of some or all of the stored cards belong to the service country and service providers of some or all of the stored cards are not identical to the service provider of the first card, determining that some or all of the stored cards belong to different service providers than the first card.

14. The method of claim 11, further comprising:

before determining whether the plurality of cards belongs to the same service provider, acquiring a service country of the mobile terminal and the IMSI of a first card and retrieving the IMSI from the NV of the mobile terminal; and when the IMSI of the plurality of cards stored in the NV is the same as that of the first card and service providers of the plurality of cards stored belong to different service countries than the service country of the first card, determining that the plurality of cards belong to different service providers than the first card.

* * * * *